United States Patent

Rittenbach

[15] 3,646,446

[45] Feb. 29, 1972

[54] BINARY INFORMATION RECEIVER FOR DETECTING A PHASE MODULATED CARRIER SIGNAL

[72] Inventor: Otto E. Rittenbach, Neptune, N.J.

[73] Assignee: The United States of America as represented by the Secretary of the Army

[22] Filed: Nov. 12, 1969

[21] Appl. No.: 875,682

[52] U.S. Cl. ....................325/320, 178/67, 178/88, 325/346, 325/349, 325/351

[51] Int. Cl. ....................H04b 1/30

[58] Field of Search ....................178/66, 67, 88; 325/30, 320, 325/346, 349, 351

[56] References Cited

UNITED STATES PATENTS

| | | | |
|---|---|---|---|
| 3,289,082 | 11/1966 | Shumate | 178/88 |
| 3,343,093 | 9/1967 | Van Gerwen | 178/66 |
| 3,517,338 | 6/1970 | Herman et al. | 178/66 |
| 3,519,740 | 7/1970 | Gassmann | 325/444 |

*Primary Examiner*—Robert L. Griffin
*Assistant Examiner*—Albert J. Mayer
*Attorney*—Harry M. Saragovitz, Edward J. Kelly, Herbert Ber and Jeremiah G. Murray

[57] ABSTRACT

A receiver for detecting phase reversed binary informatio wherein the phase reversal is accomplished linearly over on clock period by slightly increasing or decreasing the carrie frequency. A variable frequency local oscillator tuned to th carrier frequency is mixed with the phase modulated carrie signal and then averaged by a first filter. When the oscillator i at the proper phase, the output of the first filter will be a bi nary signal. A pair of feedback loops detect and compare in subtractor and a second filter the rectified outputs of a pair o mixers which beat the phase modulated carrier signal wit plus and minus 45° components of the oscillator signal. Whe the oscillator is at the proper phase, the energy from both mix ers in the feedback loop will be equal. When the oscillato phase is incorrect, the energy in the loops will be different an the output of the second filter will then increase or decreas slightly the oscillator frequency until the proper phase i reached.

4 Claims, 2 Drawing Figures

INVENTOR,
OTTO E. RITTENBACH
BY: Jeremiah G. Murray
AGENT
Harry M. Saragovitz,
Edward J. Kelly &
Herbert Berl
ATTORNEYS.

PATENTED FEB 29 1972

3,646,446

INVENTOR,
OTTO E. RITTENBACH

BY: [signature] AGENT

[signature] ATTORNEYS

BINARY INFORMATION RECEIVER FOR DETECTING A PHASE MODULATED CARRIER SIGNAL

The present invention relates to communication systems and more particularly to a binary information receiver for detecting a phase modulated (PM) carrier signal.

In the field of communications it has been the general practice to transmit binary information by periodically reversing the phase of a carrier signal in accordance with the information being transmitted. If the phase of the signal is reversed instantaneously, overtones and beat frequencies will be generated thereby requiring a broad bandwidth system for transmission. Therefore, to provide for a narrow bandwidth, it has been proposed to accomplish phase reversal by advancing the phase of the signal, linearly or gradually over one baud or clock period. This linear phase advancement can be accomplished by simply increasing slightly the frequency of the carrier signal a predetermined amount such that the phase of the carrier will be reversed after the one clock period. An example of a system which uses this technique may be found in U.S. Pat. No. 3,585,503, issued June 15, 1971 to the present inventor.

Standard PM detection is usually accomplished by detecting the instantaneous phase of the carrier signal at predetermined intervals spaced by one clock period. One of the most critical problems confronting designers of such PM detectors has been recovering the pulse time of the transmitter clock signal i.e., synchronization, so that the phase of the carrier can be detected at the proper instants. However, if the PM signal is of the type which advances the phase linearly as just described, it has been found that detection can be accomplished with relatively simple and inexpensive equipment which also automatically maximizes the signal-to-noise ratio.

It is therefore, the primary object of the present invention to provide a receiver for efficiently detecting binary PM information.

Other objects and many of the attendant advantages of this invention will be readily appreciated as the same becomes better understood by reference to the following detailed description when considered in connection with the accompanying drawings wherein.

Figure 1:
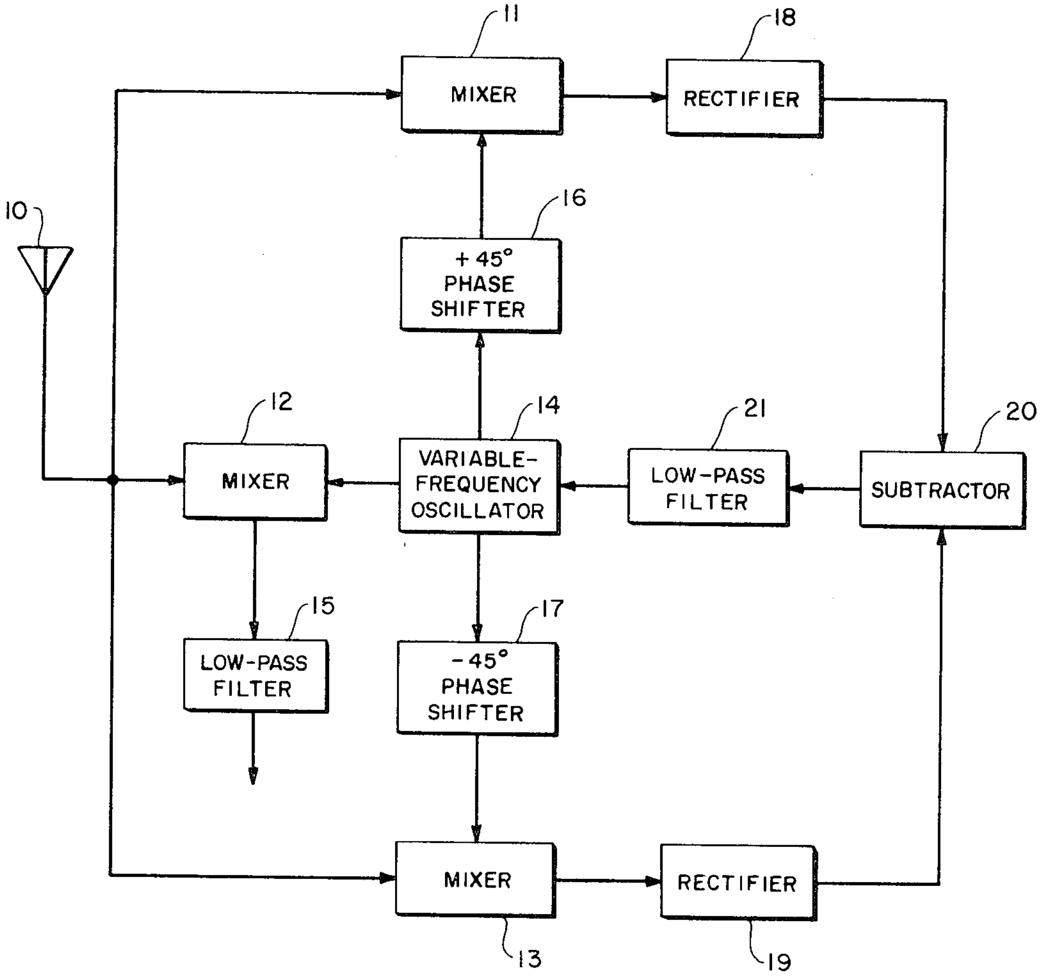
FIG. 1 is a block diagram of a preferred embodiment of the invention.

Referring now to the drawings, there is shown in FIG. 1 a PM receiver having an antenna 10, connected to three mixers 11, 12 and 13. A variable-frequency oscillator 14 which operates around the carrier frequency has a first output connected to mixer 12 which in turn is connected to a low pass filter 15. The output of low pass filter 15 may be connected to a utilization device or recorder such as a magnetic tape or drum, etc.

Second and third outputs of oscillator 14 are connected to +45° and −45° phase shifters 16 and 17 respectively which in turn are connected to mixers 11 and 13 respectively. The outputs of mixers 11 and 13 are connected to rectifiers 18 and 19 respectively, the outputs of which are connected to subtractor 20. The output of subtractor 20 is connected, via low pass filter 21, to the variable-frequency oscillator 14 for adjusting the frequency thereof.

Figure 2:
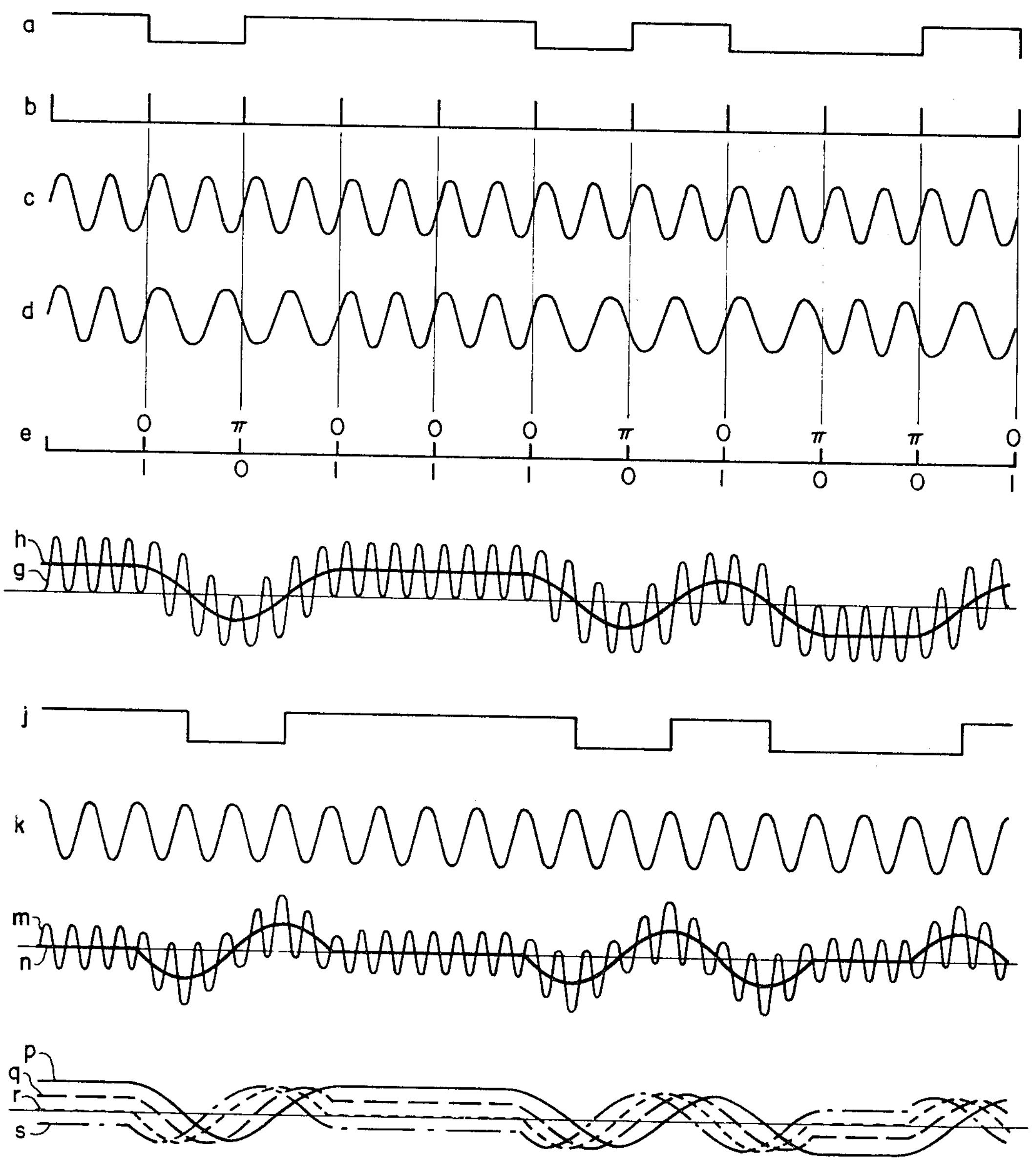
FIG. 2 is a series of waveforms helpful in understanding the invention of FIG. 1.

With reference to FIG. 2 the operation of the device of FIG. 1 will now be described. Waveform *a* represents the original binary signal, and waveform *b* represents the clock rate and pulse time of the transmitter. Waveform *c* represents the carrier wave which, for illustration only, is shown to have a frequency which is twice the clock rate. The carrier wave *c* is modulated so that the phase of the modulated wave *d* at the times of the clock pulses in waveform *b* is either 0 or 180° which in turn represent a binary 1 and 0 respectively. The phase of the carrier wave *c* is reversed by decreasing the frequency of the carrier a predetermined amount such that over one clock period the two signals differ by an odd multiple of a half wavelength. On line *e* the phase of waveform *d* and the corresponding binary digits are shown. As explained earlier, standard detection of the phase of the received wave *d* at the proper time periods would require that the receiver have some means of obtaining the correct pulse rate and pulse time of the transmitter clock, signal *b*. However, since phase reversal of the carrier is accomplished by a linear phase change over one clock period, i.e., by increasing or decreasing the frequency of the carrier a predetermined amount, detection may be performed by beating the received signal with a local oscillator which has a phase control loop such as shown in FIG. 1.

More specifically, the original binary signal *a* can be recovered from the received signal *d* with a maximum signal-to-noise ratio, if the signals *c* and *d* are mixed at the proper phase. Oscillator 14 is therefore, tuned to the carrier frequency *c* and the output is beat in mixer 12 with the received signal *d*. If the phase of the oscillator signal *c* and the received signal *d* are as shown in FIG. 2, then the output of mixer 12 would be the high frequency signal *g* and the low pass filter 15 would pass the average of signal *g* which is represented by signal *h*. Obtaining the original binary signal *a* from signal *h* could be accomplished by hard clipping or any other standard technique to produce waveform *j* which is actually a replica of waveform *a* delayed one-half baud. Operation in the manner just described is based on the assumption that the oscillator 14 is at the proper phase. If, for example, the oscillator 14 were operating at the carrier frequency but phase displaced by 90° as shown in waveform *k*, then the output of mixer 12 would be of the form *m* and the output of filter 15 would then look like waveform *n*, the average value or low-frequency component of waveform *m*. It can be seen by comparison of waveforms *h* and *n* that the area under the waveform *h* about the zero line is greater than the area under the waveform *n*, and that the waveform *n* cannot be as easily converted into a signal which would represent the original binary signal *a* as can the waveform *h*.

Waveforms *p*, *q*, *r* and *s* represent outputs of filter 15 when the output of oscillator 14 and the carrier signal *c* differ in phase by 0°, +45°, 90°, and −45° respectively. The waveform *p*, which is a repeat of *h*, besides directly representing the original signal *a*, also encloses the maximum area, as compared to waveforms *q*, *r*, and *s*, thereby having the greatest signal-to-noise ratio.

Control of the phase of oscillator 14 is accomplished by the two feedback loops having phase shifters 16 and 17, mixers 11 and 13, rectifiers 18 and 19, subtractor 20, and filter 21. The oscillator output *c* is shifted in phase by plus and minus 45° and mixed with the received signal *d* in mixers 11 and 13. After rectification in rectifiers 18 and 19 and subtraction in subtractor 20, the low-frequency component or average is extracted by filter 21. This output of filter 21 will be proportional to the amount that the phase of the oscillator 14 is different then that shown by waveforms *c* and *d*. This output is then used to increase or decrease slightly the frequency of oscillator 14 until the proper phase relationship between the oscillator 14 and the received signal *d* is reached. For example, when the oscillator 14 is in proper phase with the carrier *c*, the average value of the outputs of mixers 11 and 13 will be waveforms *q* and *s* respectively which when rectified and subtracted will be zero. It is noted that the device of FIG. 1 actually performs the subtraction first in subtractor 20 and the averaging second in filter 21. If, however, the output of oscillator 14 is not in proper phase with the carrier *c* then the outputs of rectifiers 18 and 29 will, of course, not be equal and the energy difference between these signals is used to either increase or decrease very slightly the frequency of oscillator 14. As a result, the oscillator output will slowly move into proper phase with the carrier *c* and the output of filter 21 will correspondingly go to zero. Therefore, the +45 and −45° feedback loops will automatically keep the oscillator synchronized with the carrier, thereby eliminating the need of specifically recovering the original clock rate and pulse time from the received signal.

It is to be understood, of course, that the foregoing disclosure relates to only a preferred embodiment of the invention and that numerous modifications or alterations may be made herein.

What is claimed is:

1. A receiver for detecting a phase reversed carrier signal comprising input means for receiving said carrier signal; variable frequency oscillator means for generating an output signal at the carrier frequency; mixer means connected to said input means and said oscillator means for beating said carrier signal and said oscillator output signal; a low pass filter means connected to the output of said mixer means for removing the high frequency components; and phase control means having first and second phase comparison inputs connected to said input means and the output of said variable frequency oscillator means respectively for detecting the relative phase difference between said carrier signal and said oscillator output signal and for producing at an output terminal a frequency adjusting output signal which is a function of said relative phase difference; said output terminal connected to the input of said variable frequency oscillator means for varying slightly the oscillator frequency to maintain a predetermined phase relationship between said carrier signal and said oscillator output signal.

2. The device according to claim 1 and wherein said phase control means comprises first and second feedback loops, each said feedback loop comprising a mixer means having first and second inputs connected to said input means and said output of said variable frequency oscillator respectively for beating said carrier signal with plus and minus 45° shifted components of said oscillator output signal; and means having first and second inputs connected to the output of said mixers in said first and second feedback loops respectively for comparing the energy in said feedback loops and detecting the phase difference between said oscillator output signal and said carrier signal.

3. The device according to claim 2 and wherein said means for comparing the energy in said feedback loops include a pair of rectifier means each for rectifying the outputs of each said mixer means in a different one of said feedback loops; subtractor means for subtracting the outputs of said rectifier means; and low pass filter means having an input connected to the output of said subtractor means and having an output connected to the input of said variable frequency oscillator means for varying the frequency thereof.

4. A receiver for detecting a phase reversed carrier signal comprising an antenna, first, second and third mixers each having a first input connected to the output of said antenna; a variable frequency oscillator means for generating an output signal at the carrier frequency; means connecting the output of said oscillator means directly to a second input of said first mixer; plus 45° phase shifter means for connecting the output of said oscillator means to a second input of said second mixer; minus 45° phase shifter means for connecting the output of said oscillator means to the input of said third mixer; low pass filter means connected to the output of said first mixer; first and second rectifying means connected to the output of said second and third mixers respectively; a subtractor having the output of each said rectifying means connected thereto; and low pass filter means connected between the output of said subtractor and the input of said oscillator for varying the frequency thereof.

* * * * *